United States Patent
Yokoyama et al.

(10) Patent No.: US 7,925,028 B2
(45) Date of Patent: Apr. 12, 2011

(54) ELECTRONIC DEVICE HAVING A BLOWER WITH NOISE CONTROL

(75) Inventors: Nobuhiro Yokoyama, Odawara (JP); Takashi Chikusa, Odawara (JP); Masao Iwakura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 199 days.

(21) Appl. No.: 12/026,822

(22) Filed: Feb. 6, 2008

(65) Prior Publication Data
US 2009/0129936 A1 May 21, 2009

(30) Foreign Application Priority Data
Nov. 15, 2007 (JP) ................. 2007-296506

(51) Int. Cl.
*G10K 11/16* (2006.01)
*F24F 13/24* (2006.01)
*F04D 29/66* (2006.01)
*F01D 25/04* (2006.01)

(52) U.S. Cl. ......... 381/71.2; 381/71.9; 415/119; 417/18

(58) Field of Classification Search ............ 417/18, 417/312, 423.1; 381/11–14, 71.1–71.9, 71.11, 381/71.12, 71.13, 71.14, 73.1, 94.1, 94.2, 381/94.3, 94.4, 94.5, 94.6, 94.7, 94.8; 415/119; 181/206, 225

See application file for complete search history.

(56) References Cited

U.S. PATENT DOCUMENTS

| | | | | |
|---|---|---|---|---|
| 5,370,340 A | * | 12/1994 | Pla | 244/1 N |
| 5,636,287 A | * | 6/1997 | Kubli et al. | 381/71.2 |
| 5,692,054 A | * | 11/1997 | Parrella et al. | 381/71.3 |
| 5,791,869 A | * | 8/1998 | Lee | 415/119 |
| 7,059,820 B2 | * | 6/2006 | Hosny et al. | 415/1 |

FOREIGN PATENT DOCUMENTS

| | | | |
|---|---|---|---|
| JP | 03198672 A | * | 8/1991 |
| JP | 6-508695 | | 9/1994 |
| JP | 2005-076585 | | 3/2005 |
| WO | 93/02445 | | 2/1993 |

* cited by examiner

*Primary Examiner* — Devon C Kramer
*Assistant Examiner* — Nathan Zollinger
(74) *Attorney, Agent, or Firm* — Brundidge & Stanger, P.C.

(57) ABSTRACT

An electronic device having a first motor which rotates a rotating body (for example, blades) about a rotation axis and a second motor which vibrates a vibrator including the rotating body in the axial direction is provided. A control IC unit has a first circuit which subjects the rotation to control drive by a first waveform, and a second circuit which subjects the vibration to control drive by a second waveform. Rotation and vibration of a rotating and vibrating unit driven by the first and second motors generates an airflow and output sound by a synthesized output of a first output corresponding to the rotation and a second output corresponding to the vibration. The control IC unit generates a second waveform by using a reversed-phase waveform with respect to the first waveform or the like and suppresses the output sound by control of the first and second waveforms.

2 Claims, 13 Drawing Sheets

FIG. 2

| CONFIGURATION | FIRST MOTOR (FOR ROTATION DRIVE) | SECOND MOTOR (FOR VIBRATION DRIVE) | A: FAN SPEED | B: VIBRATION SENSOR | C: MICROPHONE | NOISE-REDUCTION SPEAKER | MASTER-SLAVE CONTROL | OTHERS |
|---|---|---|---|---|---|---|---|---|
| 1 | SONIC MOTOR | VCM | ○ | ○ | ○ | — | — | SHIELDING MEANS NOT REQUIRED |
| 2 | ROTOR ROTATING MOTOR | ◇ | ○ | ○ | ○ | — | — | — |
| 3 | ROTOR ROTATING MOTOR | — | ○ | ○ | ○ | ○ | — | — |
| 4 (MASTER) | ◇ | ◇ | ○ | ○ | ○ | — | ○ (MASTER) | — |
| 4 (SLAVE) | ◇ | ◇ | — | — | — | — | ○ (SLAVE) | — |
| 5 | ◇ | ◇ | — | — | ○ | — | — | CONTROL PER BAND |
| 6 | ◇ | ◇ | — | — | ○ | — | — | RECORD AND PLAY |

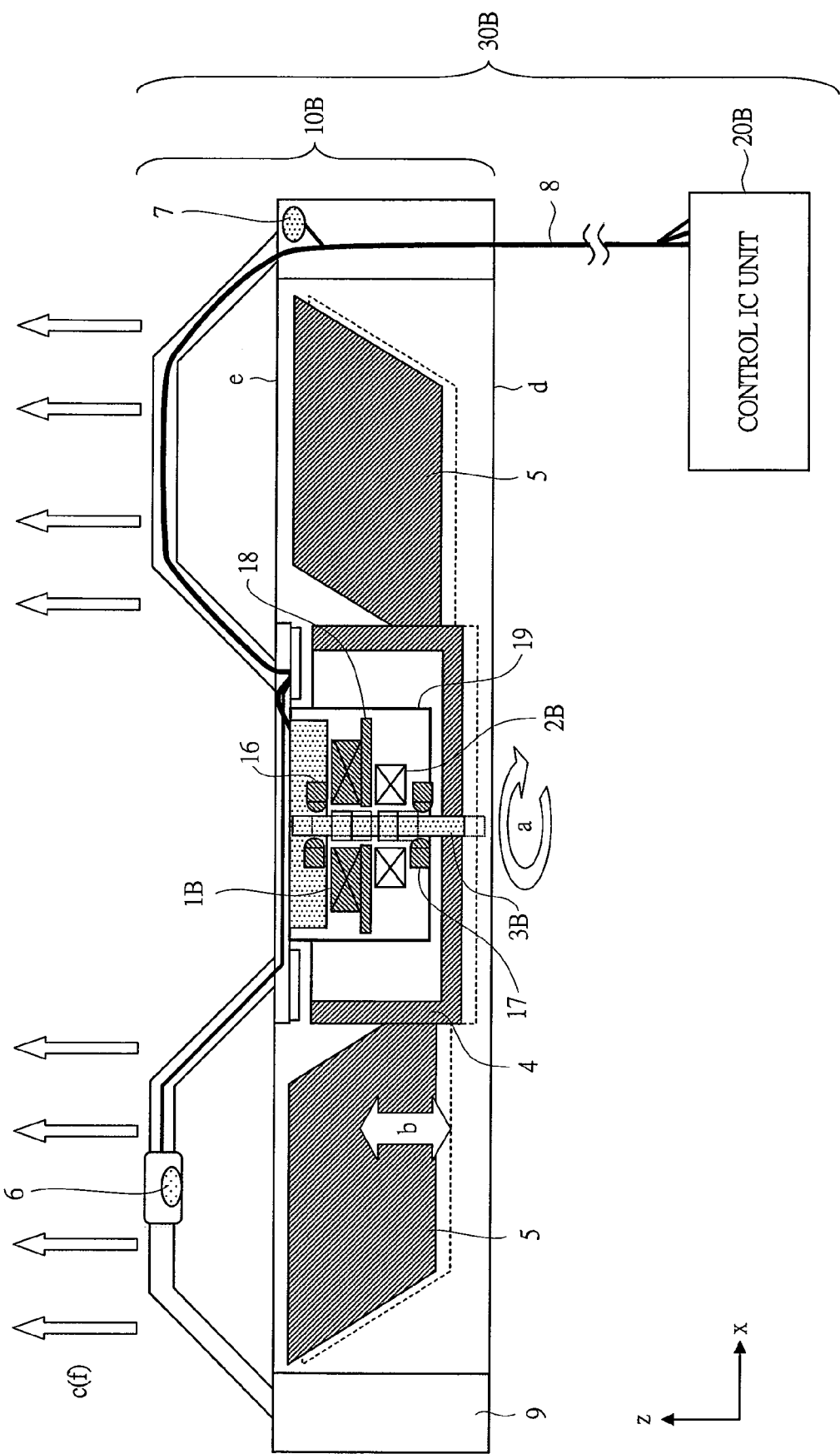

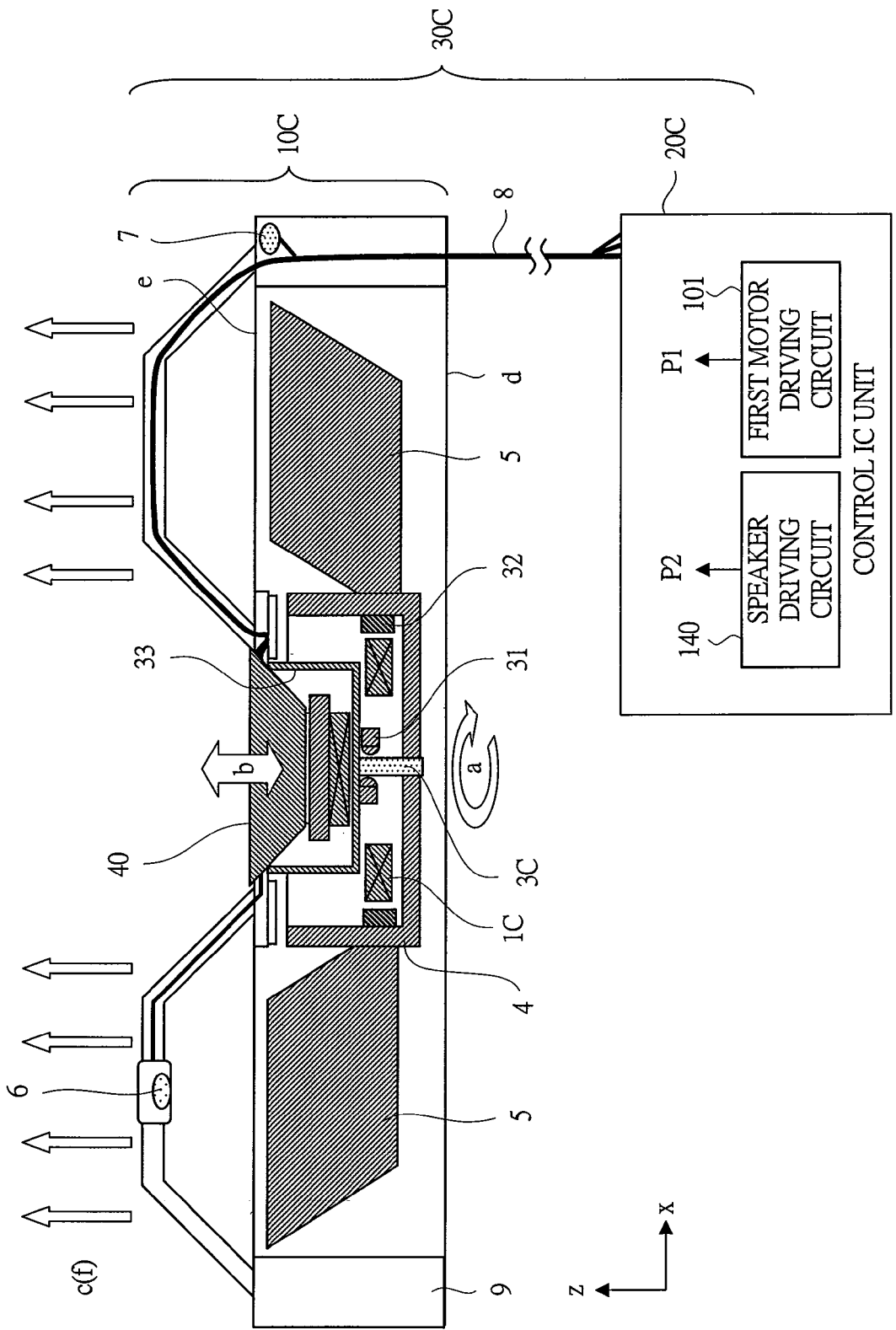

ELECTRONIC DEVICE HAVING A BLOWER WITH NOISE CONTROL

CROSS-REFERENCE TO RELATED APPLICATION

The present application claims priority from Japanese Patent Application No. JP 2007-296506 filed on Nov. 15, 2007, the content of which is hereby incorporated by reference into this application.

TECHNICAL FIELD OF THE INVENTION

The present invention relates to a fan (blower) and an electric/electronic device, information-processing apparatus and the like having a fan. More particularly, the present invention relates to a technique of noise reduction.

BACKGROUND OF THE INVENTION

Along with performance improvement of electronic devices, heat generation thereof has been increased as well. If the heat is left untreated, it invites a situation in which the failure of the device, performance deterioration, shortened life time and so on. Therefore, the device has to be equipped with a cooling function. Generally, a fan is used for the cooling function. Examples of the means for enhancing the cooling performance of a fan include increasing the number of revolutions (revolving speed) of the fan and increasing the number of mounted fans. For example, high cooling performance is required for a countermeasure against increased heat generation caused along with high-density mounting in a disk array apparatus, and thus a cooling method using a high-output fan is employed therefor.

However, the fan used in cooling of a heat-generating electronic device and the like is the major generation source of noise in the electronic device (for example, disk array apparatus). A simple means or countermeasure for suppressing or insulating noise of the fan is, for example, to provide an additional object or equipment for a countermeasure against noise such as a sound insulation wall in an object matter to which the fan is provided.

In any of the above-described methods for enhancing the cooling performance, noise is increased. In other words, the cooling performance and silent (noise reduction) performance conflict with each other. When the cooling performance is enhanced, noise is increased; and, when the silent performance is increased, the heat cannot be readily cooled.

As a conventional technique for eliminating or suppressing noise of the fan, for example, a technique of eliminating or suppressing noise (generated-sound) by transmitting a waveform of an opposite (reversed) phase with respect to the noise of the fan by a speaker provided separately from the fan and cancelling out and merging (mixing) the waveforms is known as so-called active noise reduction (ANR).

As a conventional technique of a fan and ANR is described in Japanese Patent Application Laid-Open Publication No. 6-508695 (Patent Document 1). All the techniques disclosed in this document are the type that carries out active noise reduction by a speaker mounted separately from the fan, and this type is conceivably invented for reducing the noise of a large fan. However, this method is difficult to be realized in the electronic devices in which downsizing and increase in density is notable. Generally, a large dimensional restriction is imposed on an electronic device by an aspect of functions such as requirements for space saving and rack mounting. Therefore, in many cases, the fan is mounted on an inside of back end of a chassis of the device. Also, there is a requirement in terms of design that the opening area is desired to be designed large in order to enhance exhaust capability (cooling capability) as much as possible. With respect to this, the above-described conventional technique has a problem that the opening area has to be reduced when the speaker is set in the vertical direction of the fan, and dimensional restrictions are large when the speaker is set in the front/rear direction of the fan.

Further, a conventional technique in an equipment field other than the above-described conventional technique is described in Japanese Patent Application Laid-Open Publication No. 2005-76585 (Patent Document 2). The technique disclosed in this document employs a method for reducing noise by vibrating a fan installed in a duct of a ventilation hole by an active-type magnetic bearing. However, this is a large-scale technique in which magnetic bearing units are disposed at front and rear of the fan and cannot be applied to general electronic devices as well as the above described conventional technique.

Furthermore, normally, as a usage system of a fan in an electronic device, not the method that obtains high torque/high output by increasing the size of the fan alone and feeding a large current but the type that carries out cooling by a combination of a plurality of small fans of medium/low output is popular in the case where, for example, the cooling performance with respect to equipment is deficient. One reason thereof is to ensure redundancy against a fan failure, and another reason thereof is to avoid the influence on cables, connectors, power source, etc. since the power source voltage (DC voltage) by which the electronic device is operated with low voltage, thus a large current is needed compared with the fan output power.

SUMMARY OF THE INVENTION

Accordingly, in order to solve the problems against the electronic device as described above, noise (emitted sound) generated by individual fans has to be basically reduced, and furthermore, the noise (noise generated due to sound pressure difference, rotational phase difference, etc. generated by variations in characteristics, intake/exhaust resistance difference, etc. of individual fans) generated as a fan group has to be reduced.

As described above, there is an aspect that the cooling performance and the silent performance conflict with each other in the cooling function using a fan and a configuration thereof, and if a sound insulation wall or the like is simply provided as a noise countermeasure, the cost is unnecessarily increased.

The present invention has been made in view of the foregoing problems, and a main object of the present invention is to provide a technique which relates to a fan (or an electronic device or the like) and are capable of ensuring the cooling performance and also obtaining a noise reduction (silent) effect.

The typical ones of the inventions disclosed in this application will be briefly described as follows. In order to achieve the above described object, a typical embodiment of the present invention is a technique of a fan (blower) or an electronic device or the like having a fan and are characterized by having the following configuration.

The principle of both a fan and a speaker is the same electromagnetic induction mechanism. The fan has characteristics of a constant frequency and small sound pressure variation according to resonance of noise of a frequency based on the revolution number of the fan with peripheral parts. Therefore, generation of a reversed-phase waveform with respect to a fan output sound (generated-sound) is comparatively easy.

In the present mode, a fan itself is made to have a noise reduction function (ANR function) performed by drive-control of rotation and vibration. As a result, both the cooling performance and silent performance of the fan can be implemented. In the present mode, as well as the above-described principle of a speaker, the fan has a mechanism which can vibrate in the direction of the airflow and rotation axis, i.e., a structure which can rotate and vibrate by a rotating body and a vibrator (rotating and vibrating unit). In addition to that, in the present mode, as noise reduction control, a component having a reversed phase with respect to the noise of the fan (output waveform generated by its basic rotation) is given by vibration in the axial direction of the rotating and vibrating unit. Thus, for the output of the fan, control is performed so that the generated-sound generated by merging (mixing) of the rotation and vibration attains a noise minimum state. A control circuit and the like generate a waveform of a reversed phase, and in control of the vibration corresponding to the waveform, feedback control and the like are performed so that the power-level of the synthesized sound of the fan output is minimum.

An electronic device of the present mode having a blower has, for example, the following configuration. The present electronic device includes a control circuit unit which controls the blower. The blower comprises a rotating body including a fan blade and a spindle for generating an airflow and a vibrator including the rotating body. The rotating body and the vibrator serve as a rotating and vibrating unit in combination. The blower comprises a first motor which rotates the rotating body about the shaft (spindle), and a second motor which vibrates the vibrator in the direction of the spindle. The control circuit unit has a first circuit which outputs a signal of a first waveform for the rotation to the first motor so as to perform drive-control of the rotation, and a second circuit which outputs a signal of a second waveform for the vibration to the second motor so as to control drive of the vibration. The rotation and vibration of the rotating and vibrating unit generated by driving the first and second motors generates an airflow and output sound (generated-sound) generated by a synthesized output of a first output corresponding to the rotation and a second output corresponding to the vibration. The control circuit unit generates a second waveform by a second circuit or an upper-level circuit thereof or the like by using a reversed-phase waveform (waveform having a reversed phase) with respect to the waveform obtained by converting the noise generated by the drive of the first motor into an electric signal or a corrected waveform of the electric signal obtained by computing the signal or the like of the drive of the first motor and controls the airflow and generated-sound which are generated by the synthesized output by control of the first and/or second waveforms. Main noise reduction control is performed by the second waveform, and control of the first waveform can be omitted. Note that, the fan output sound means, in other words, generated-sound or emitted-sound, and noise reduction or silent means to turn down the emitted-sound.

Furthermore, the present mode comprises, for example, a microphone which detects the fan output sound, a circuit which detects the number of revolutions of the rotating body, and a sensor which detects the state of the vibration of the vibrator, and the detected signals thereof are used as control inputs for control of the control circuit unit etc. For example, it is configured to perform control so that the output sound attains a noise-reduced state by using a microphone input (fan output sound).

The effects obtained by typical aspects of the present invention will be briefly described below. A typical embodiment of the present invention relates to a fan, an electronic device or the like and is capable of ensuring the cooling performance and the noise reduction effect.

By realization of the noise reduction effect, particularly in an object to which a fan is provided, an additional noise countermeasure matter or equipment such as a sound insulation wall can be eliminated. Moreover, particularly also in an electronic device such as a disk array apparatus which is comparatively large and requires high cooling performance, silent performance can be satisfied by applying the fan, which is effective.

BRIEF DESCRIPTIONS OF THE DRAWINGS

FIG. 2 is a diagram correctively showing features, components and so on of the respective embodiments of the present invention;

FIG. 8 is a diagram showing a cross section and a schematic configuration of a fan in an electronic device according to a second embodiment (second configuration) of the present invention;

FIG. 9 is a diagram showing a cross section and a schematic configuration of a fan in an electronic device according to a third embodiment (third configuration) of the present invention;

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

<Basic Configuration>

Figure 1:
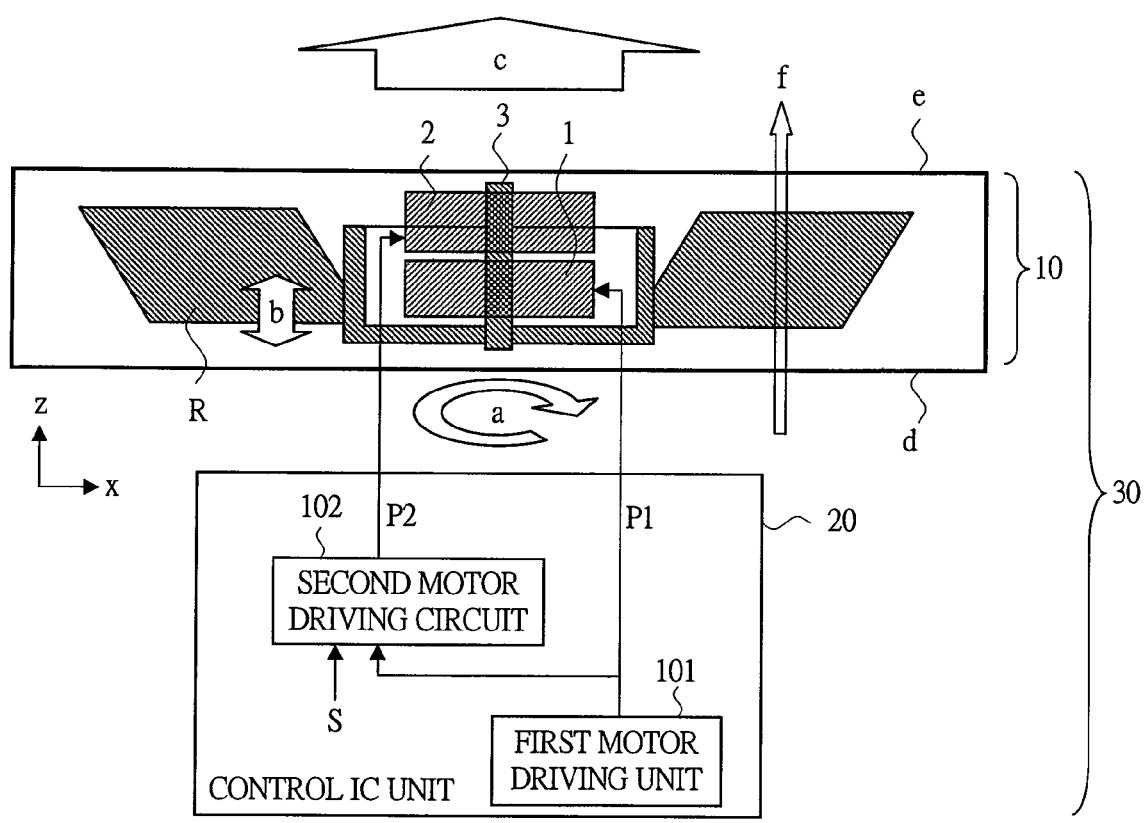
FIG. 1 is a diagram showing, as an embodiment of the present invention, an electronic device of a basic configuration including technical features which are common to respective embodiments of the present invention.

First, FIG. 1 shows an electronic device 30 of a basic configuration including technical features common to the configurations of respective embodiments which will be described below. Each of the detailed configurations will be described later. The configuration of the electronic device 30 comprises a fan (blower) 10 and a control IC unit 20 (control circuit unit) which performs control of the fan. When the electronic device 30 is a device (for example, a disk array apparatus) having an original function (for example, hardware or software) as the electronic device 30 in addition to the cooling function by the fan 10 and the control IC unit 20, the electronic device 30 has a part of the original function which is not shown, and heat generated by it is cooled by the cooling function. Further, when a main function of the electronic device 30 is the cooling function by the fan 10 and the control IC unit 20 (in other words, a fan equipped with a noise reducing function), other parts are not necessary to be comprised.

The fan 10 is an axial-flow fan (propeller fan) in this example. Note that, it is also applicable to a blower of other types (for example, multi-blade fan). The fan 10 has a rotating and vibrating unit R including a fan blade unit (the parallelogram part in FIG. 1). The rotating and vibrating unit R is a rotating body that rotates about a rotation axis (spindle) 3 and is a vibrator in the direction of the rotation axis 3 (z direction). The reference symbol "a" denotes the rotation at the rotation axis 3, and "b" denotes the vibration in the axial direction (z direction). Air flows in the axial direction by the rotation of the rotating and vibrating unit R. The reference symbol "c" denotes a comprehensive airflow of the fan 10 and output sound (generated-sound) corresponding to that. The reference symbol "d" denotes a surface of an intake opening of the fan 10, and "e" denotes a surface of an exhaust opening of the fan 10. The reference symbol "f" denotes part of a simplified airflow (c) by the fan 10 in which air flows in from the surface d and the air flows out from the surface e. The airflow and output sound (c) of the fan 10 is generated by a combined operation of the rotation (a) and the vibration (b) of the rotating and vibrating unit R according to signals having two types of waveforms (P1, P2).

A first motor 1 for fan rotation drive is connected to the rotation axis 3 of the rotating and vibrating unit R. Further, a second motor 2 for vibration drive is connected to the rotation axis 3 of the rotating and vibrating unit R (or the first motor 1). The second motor 2 is, in other words, a noise reduction control motor. The motors (1, 2) are connected to corresponding driving circuits (101, 102) of the control IC unit 20, respectively.

In the control IC unit 20, in basic drive, i.e., drive without noise reduction control, the first motor driving circuit 101 outputs a signal of a first waveform P1 for rotation drive to the first motor 1, and the rotation (a) of the rotating and vibrating unit R is driven when the first motor 1 is operated in accordance with this signal. Main airflow and output sound (c) is generated by the rotation (a). Also, the second motor driving circuit 102 outputs a signal of a second waveform P2 for vibration drive with respect to the second motor 2, and the vibration (b) of the rotating and vibrating unit R is driven by operating the second motor 2 in accordance with this signal. The vibration (b) generates an influence, i.e., a noise reducing action against the airflow and output sound (c).

In the second motor driving circuit 102 (or another circuit unit in the control IC unit 20), by using the first waveform P1 and the like outputted from the first motor driving circuit 101, a waveform (reversed-phase waveform) which has a reversed phase of the first waveform P1, and a signal of the second waveform P2 is generated by using this waveform and outputted to the second motor 2. Particularly, other than directly using the first waveform P1 (for example, using it as data for computing), the second motor driving circuit 102 (or another circuit unit in the control IC unit 20) performs drive (feedback control or the like) for generating the second waveform P2 by using, for example, a signal (denoted by S in FIG. 1) obtained by sensing (monitoring) drive results (for example, a, b, c) caused by the first waveform P1 and processing (for example, correction process) it.

As a result of this control, first sound (particularly, an acoustic wave of a basic frequency serving as a noise component) caused by the basic rotation (a) synthesized with second sound (particularly, reversed-phase sound with respect to the acoustic wave of the basic frequency serving as a noise component) including the phase-inverting action caused by the vibration (b) of the noise reduction control is obtained as the output sound (c) of the fan 10. As a result, the comprehensive output sound (c) is suppressed (reduced).

For example, the second motor driving circuit 102 or an upper-level circuit thereof uses, as the signal S, a waveform obtained by sensing the noise generated by drive of the first motor 1 and converting it into an electric signal is used, or, as the electric signal, a waveform obtained by correcting signal and the like of the drive of the first motor 1 by computing is used. And, the second motor driving circuit 102 generates the second waveform P2 by using a waveform which is phase-inversion of the waveform (signal S). Then, the control IC unit 20 suppresses the airflow and generated-sound caused by the synthesized output by control of the first waveform P1 and/or the second waveform P2. Note that, the fan output sound means generated-sound or emitted-sound, and sound reduction means to turn down the emitted-sound.

Note that, main noise reduction control is performed by the second waveform P2, and control relating the first waveform P1 (rotation control) can be omitted. For example, the rotation control can be composed of merely simple power supply to the fan 10 (power on/off). This is effective, for example, when the number of revolutions of the fan cannot be reduced so much for cooling.

<Configurations>

FIG. 2 collectively shows features, components, etc. of respective embodiments (configurations) for easy understanding. The rows numbered by the configurations show corresponding embodiments or modification examples and the like, respectively. The items of the rows include: the first motor 1 (for rotation drive), the second motor 2 (for vibration drive), A: the number of fan revolution (fan speed), B: vibration sensor, C: microphone (output sound), a noise reduction speaker, master-slave control, etc. The mark "○" means that the item is provided, the mark "–" means that the item is not provided (or no particular limitation), and the mark "◇" means a predetermined configuration (not particularly limited thereto).

Note that, as a control input, the A: the number of fan revolution corresponds to monitoring of the rotation (a), i.e., monitoring of the results (output) of rotation drive by the first motor. The B: vibration sensor corresponds to monitoring of the vibration (b), i.e., monitoring of the results (output) of vibration drive by the second motor 2. The C: microphone (output sound) corresponds to monitoring of the rotation (a) + the vibration (b), i.e., monitoring of the fan output sound (c) caused by the result (output) of the rotation and vibration drive by the first motor 1 and the second motor 2.

In a first embodiment, a sonic motor is used as the first motor 1, a voice coil motor (VCM) is used as the second motor 2, and A, B and C are used as control inputs. In addition, as a point of the "others", shielding means (for example, magnetic-force-line shielding plate) for preventing adverse effects between the adjacent motors (1, 2) is not required. In a second embodiment, a predetermined motor for vibration drive is used as the second motor 2, and A, B and C are used as control inputs. In a third embodiment, a rotor-rotating motor is used as the first motor 1, the second motor 2 is not used, a speaker for noise reduction control is provided, and A, B and C are used as control inputs.

As another configuration example, in a fourth configuration, master-slave control using a plurality of fans is performed. A fan that serves as a master has a configuration same as the above described embodiment, for example, the first embodiment and performs highly precise control by using various control inputs (A, B, C) and the like. A fan that serves as a slave operates in a manner following (synchronized with) the operation (control) of the main fan and thus it has a configuration simplified more than the main fan.

As still another configuration example, a fifth configuration uses a control input of the C: microphone and the like and is a configuration that performs different control for each frequency band of the control objective sound (configuration that applies, for example, a different circuit and motor thereto). Further, a sixth configuration is a configuration that performs control by using sound recorded in advance instead of using the real-time output sound (c) as a control input.

The respective configurations that use the control inputs (A, B, C) may be implemented, for example, as a configuration that performs control by using merely part of itself. Other than these configurations, configurations in which various elements are combined can be also implemented.

First Embodiment

Figure 3:
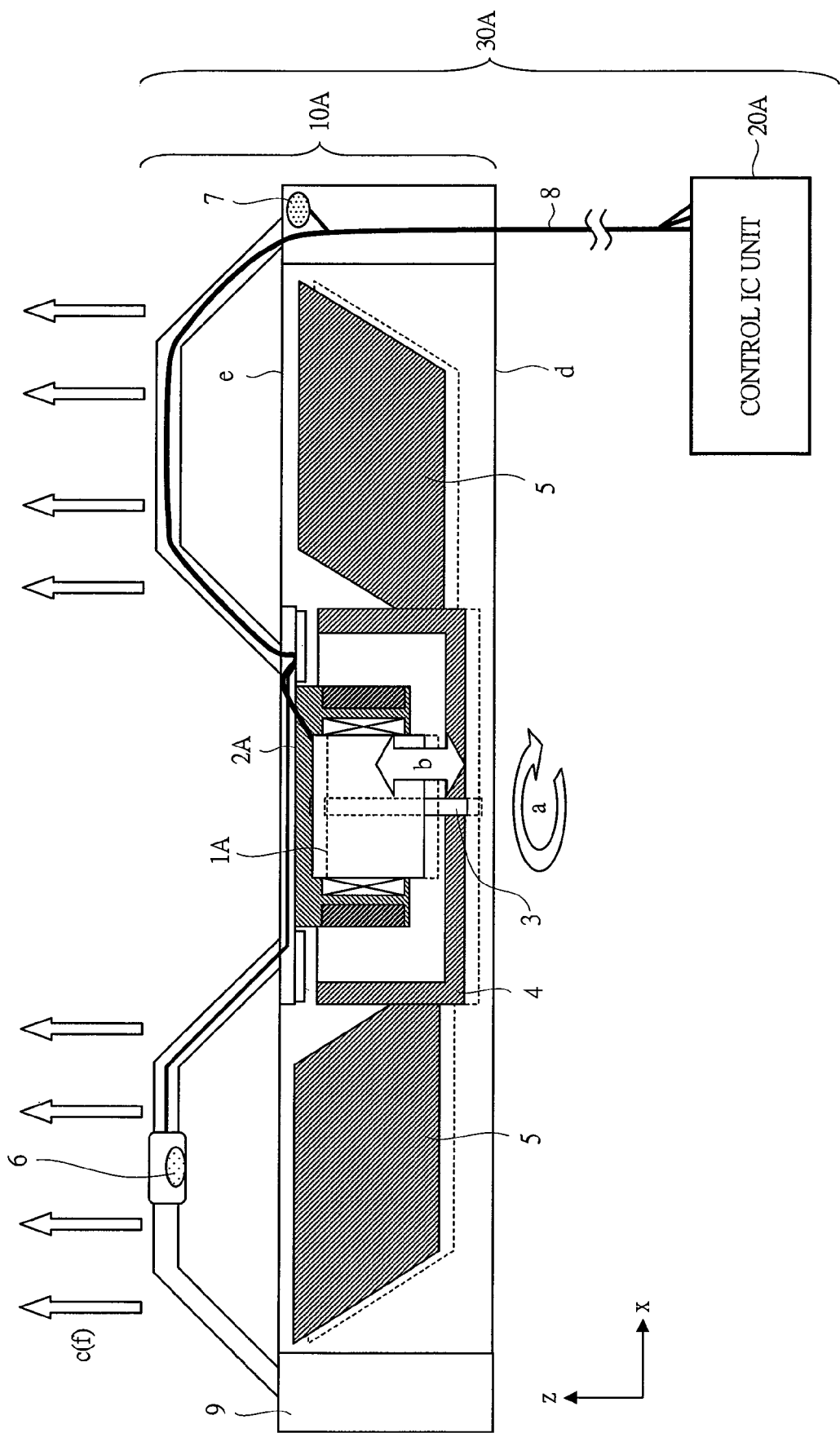
FIG. 3 is a diagram showing a cross section and a schematic configuration of a fan in an electronic device according to a first embodiment (first configuration) of the present invention.

An electronic device 30A of the first embodiment (first configuration) of the present invention will be described with reference to FIG. 3 to FIGS. 7A to 7D, etc. The electronic device 30A has a fan 10A and a control IC unit 20A. FIG. 3 shows a cross section and a schematic configuration of the fan 10A, FIG. 4 shows details of the structure of the fan 10A (particularly, motor) in FIG. 3, FIG. 5 shows a planar configuration example viewed from the surface e of an exhaust opening side of the fan 10A, FIG. 6 shows a circuit configuration example of the control IC unit 20A, and FIGS. 7A to 7D show examples of waveforms of control performed by the control IC unit 20A.

The first embodiment has the following configuration as an overview (note that, reference numerals are corresponding to the following description). The present device has, as basic noise reduction control by the control IC unit 20A, control performed by a combination of drive-control of the fan rotation (a) by the first motor 1 and the like and drive-control of the vibration (b) of the rotating and vibrating unit R in the axial direction (z direction) by the second motor 2 and the like. In this control, the motors (1, 2) are subjected to control drive by corresponding waveforms (P1, P2) so that the output sound (second sound) caused by a phase-inverting action by controlling the vibration (b) is synthesized with respect to the basic output sound (first sound) caused by controlling the rotation (a) in the airflow and output sound (c) of the fan 10A. Consequently, the output sound (c) of the fan 10A is suppressed. Furthermore, as control inputs for this control, for example, the output sound (c) is detected by a microphone 6, and the vibration (b) is detected by a base vibration sensor 7. And feedback control is performed based on these, thereby performing control using the above described waveforms (P1, P2) so that the fan output is in an appropriate noise-reduced state (i.e., minimum noise level).

Figure 4:
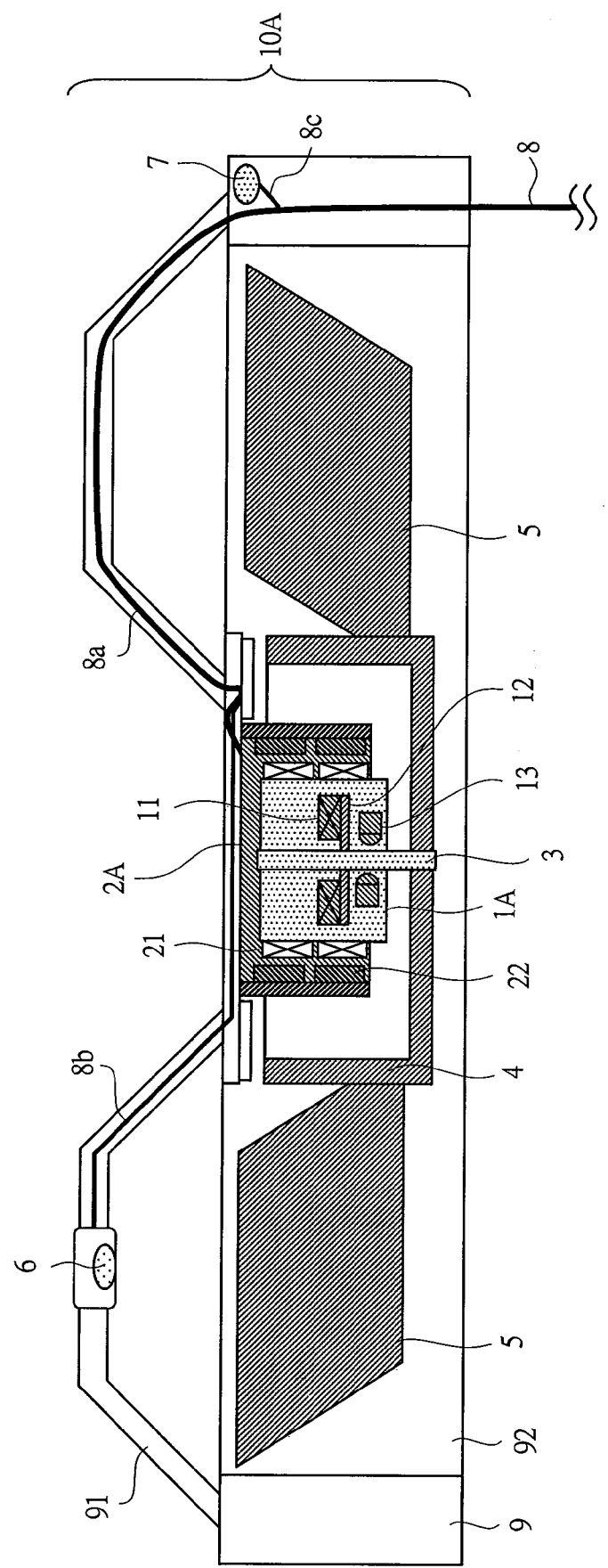
FIG. 4 is a diagram showing details of the structure of the fan of FIG. 3 in the electronic device according to the first embodiment of the present invention.
Figure 5:
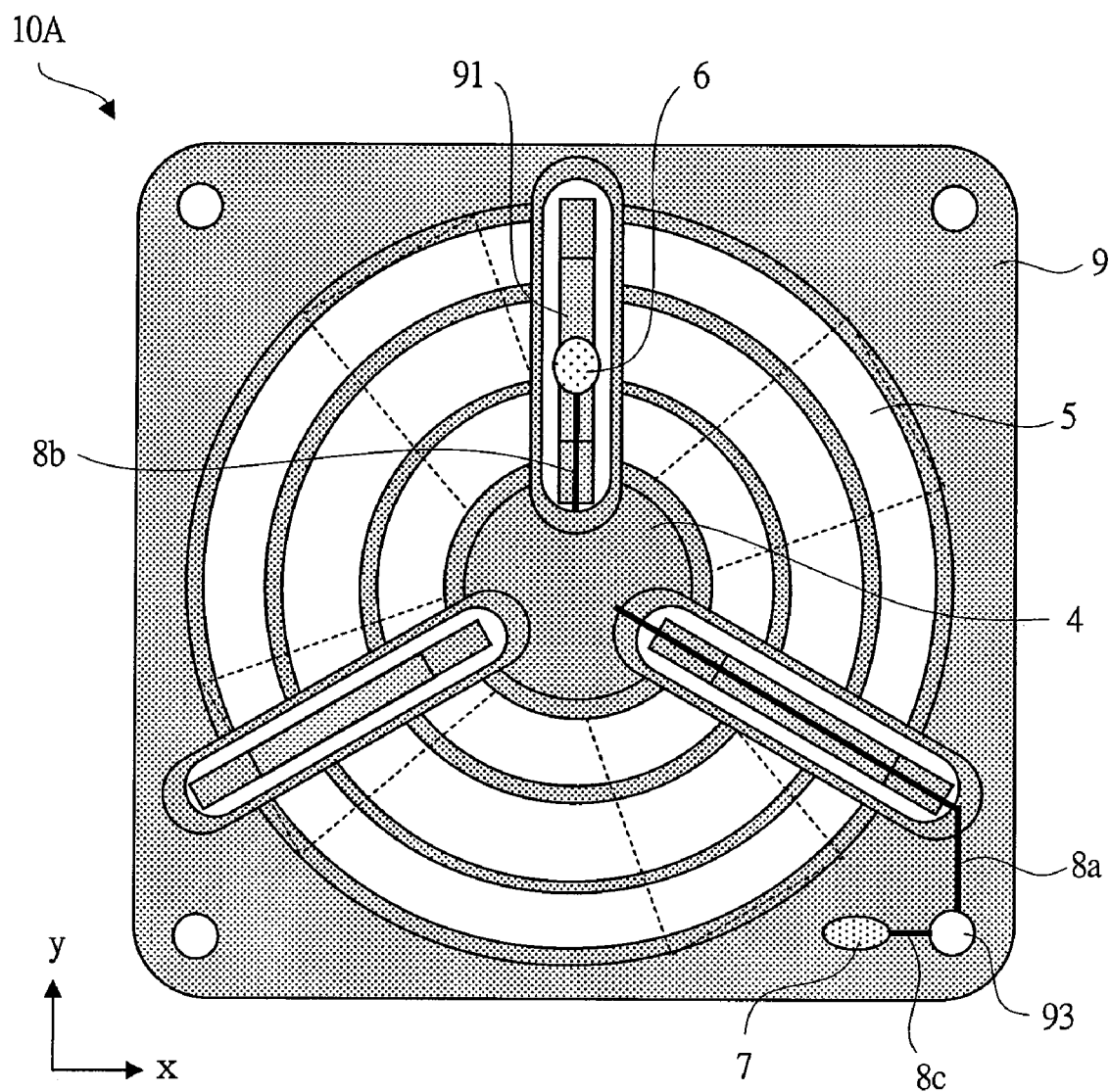
FIG. 5 is a diagram showing a planar configuration example viewed from a surface of an exhaust opening side of the fan in the electronic device according to the first embodiment of the present invention.

In FIG. 3 and FIG. 4, the fan 10A is connected to the control IC unit 20A via a control line 8, thereby constituting the electronic device 30A as a whole. The fan 10A has, in a chassis 9, the rotation axis (spindle) 3, a spindle-ASSY unit 4 (housing unit of motor, etc.), a fan blade 5, etc. constituting the rotating and vibrating unit R, and these are physically connected (integrated). The first motor 1A (ultrasonic motor) for rotation drive is provided with respect to the rotation axis 3 of the rotating and vibrating unit R, and the second motor 2A (voice coil motor (VCM)) for vibration drive is provided outside the first motor 1A. A VCM structure serving as the second motor 2A is formed by winding coil outside the first motor 1A. In the chassis 9, the microphone 6 (fan output sound sensor) is provided to the side of the exhaust opening surface e, and a base vibration sensor 7 (vibration detector) is provided in the vicinity of the rotating and vibrating unit R. Moreover, control lines 8 (8a, 8b, 8c), etc. connecting the respective units (1A, 2A, 6, 7, etc.) to the control IC unit 20A are provided. Note that, the wiring of the control lines 8 and so on can be arbitrarily selected. The control lines 8 include power supply lines to the motors and the fan.

Figure 6:
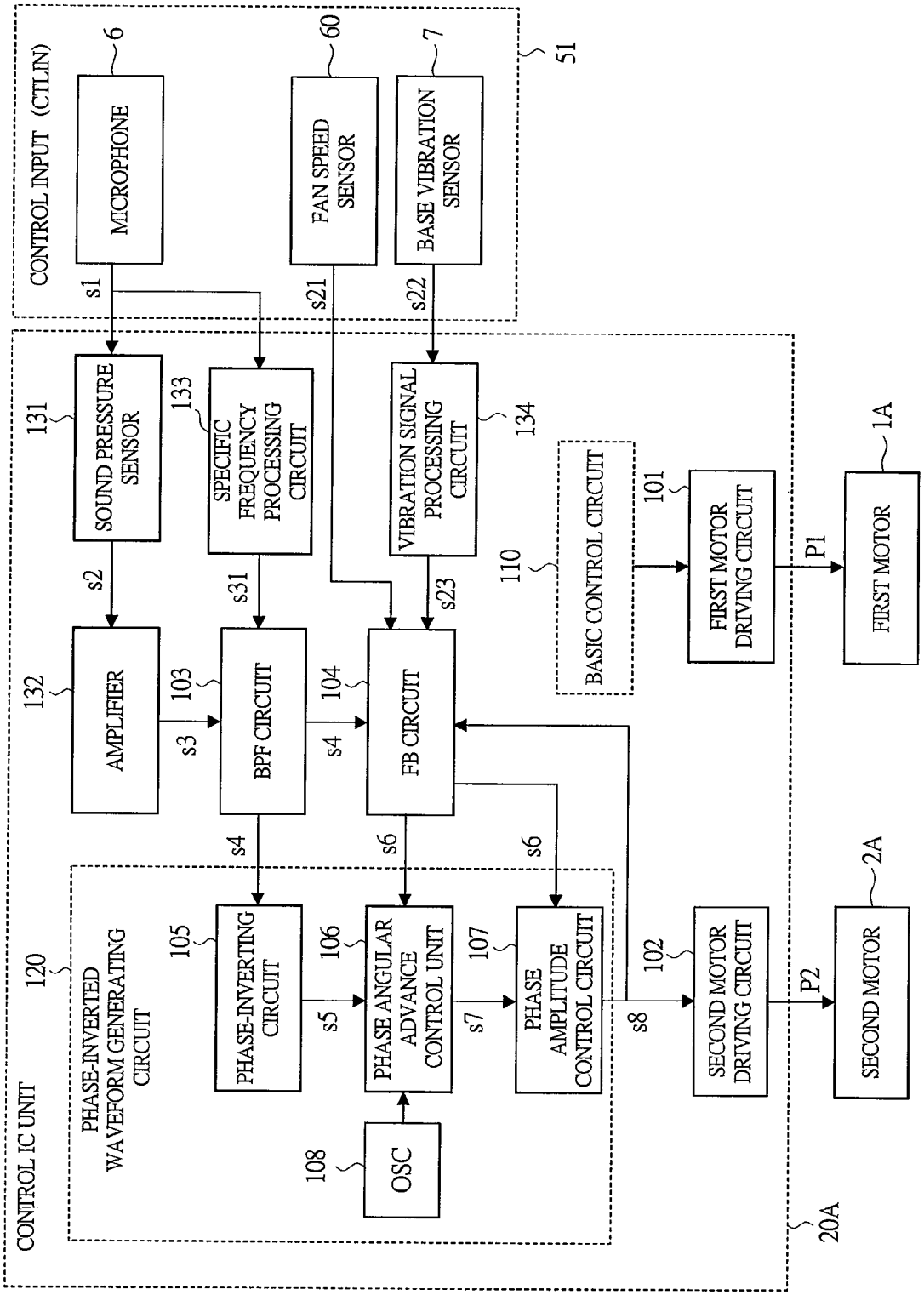
FIG. 6 is a diagram showing a circuit configuration example of a control IC unit in the electronic device according to the first embodiment of the present invention.

The control IC unit 20A performs at least a processing of noise reduction control (including control of the first motor 1 and the second motor 2) of the fan 10A, and the processing is realized by a circuit as shown in FIG. 6 (or, for example, a program processing).

The first motor 1A is connected to the rotation axis 3 of the rotating body (including 4, 5). The number of revolutions (speed) of the rotating body is controlled by the rotation (a) control of the first motor 1A. In the first embodiment, the rotating and vibrating unit R includes the first motor 1A in addition to the blades 5 and the like. The second motor 2A is configured to be in the vicinity of and covers the rotation axis 3 and the first motor 1A of the rotating and vibrating unit R.

As shown in FIG. 4, the first motor 1A (ultrasonic motor) has a structure (publicly known technique) comprising elements such as a stator 11, a rotor 12, and a bearing 13 and does not include a magnet. The second motor 2 (VCM) is an electrodynamic vibration device and has a structure (publicly known technique) that generates vibration by using a voice coil 21 and a magnet 22.

As shown in FIG. 4, the rotating and vibrating unit R is housed in an internal space 92 of the chassis 9. The motors (1A, 2A) etc. are housed in the spindle-ASSY unit 4. At the exhaust opening surface e side of the chassis 9, for example, a cover unit 91 (bridge structure) is provided. The control lines 8 such as the control line 8a of the motors (1A, 2A), the control line 8b of the microphone 6, and the control line 8c of the base vibration sensor 7 are connected to the control IC unit 20A via the chassis 9, for example, via the cover unit 91 and a side surface.

Further, in this configuration, the microphone 6 is provided at a position to which the airflow and output sound (c) of the fan 10A leaks, for example, at a part of the cover unit 91 above the blades 5. The signal of the output sound (c) detected by the microphone 6 is inputted to the control IC unit 20A via the control line 8b, and noise reduction control is performed by using this signal.

The signal of drive-control from the control IC unit 20A is inputted to the respective motors (1A, 2A) via the control line 8a. The signal of the number of fan revolutions outputted from the first motor 1A is inputted to the control IC unit 20A via the control line 8a and used in noise reduction control. The signal of base vibration detected by the base vibration sensor 7 is inputted to the control IC unit 20A via the control line 8c and used in noise reduction control.

The planar configuration of FIG. 5 shows an example of appearance. In this example, in the exhaust opening side of the rectangular chassis 9, the cover unit 91 having a plurality of bridges is provided. The microphone 6 is provided at a position of a part of the cover unit 91. The wiring of the control lines 8 is an example. Note that, for an easy understanding, while the control lines 8 are shown in a manner that they are exposed to outside, they may be housed inside. Further, the shape and the like of the blades 5 in the interior are examples.

Further, for example, four corners of the chassis 9 of the fan 10A are used as fixing parts (or, for example, connecting part with the main body of electronic device 10A or the installation surface of the electronic device 10A), and an interface (I/F) part for a connection with, for example, the control IC unit 20A or other fans (see fourth configuration) is provided at the fixing parts. In the example of FIG. 5, one of the four corners of the chassis 9 is an I/F part 93. In the I/F part 93, the respective control lines 8 of the fan 10A are gathered and connected to the control IC unit 20A, which is not shown.

<Control>

In the control by the control IC unit 20A, by controlling drive of the second motor 2A by the signal of the second waveform P2, the vibration (b) is provided with respect to the rotating and vibrating unit R (including the first motor 1A) in the axial direction (z direction) corresponding to the direction of the airflow (c) (broken lines represent vertical vibrations of the rotating and vibrating unit R). When the reversed-phase output (sound) generated by the vertical vibration (b) generated by the second motor 2A is synthesized with respective to the output (sound) generated by the fan rotation (a) generated by the first motor 1A, the comprehensive output sound (c) is suppressed. Note that, although it is not shown, in the vibrating second motor 2A, a guide mechanism or the like in the axial direction (z direction) which also prevents rotation by a pulley, a vertical groove structure, or the like is provided so that the motor itself is not rotated by the rotating stress of the fan (since it has a floating structure).

In the control by the control IC unit 20A, the number of the fan revolutions is detected as the state of the rotation (a) by the first motor 1A and subsidiarily used as a control input. As the number of fan revolutions, for example, the output of a signal detected by a fan revolution number detection circuit incorporated in the first motor 1A can be used. In other words, in this control, the state of the rotation (a) by the first motor 1A is monitored by using the number of fan revolutions, and feedback control, etc. is performed, thereby performing highly precise control about the control of fan-rotation drive (noise reduction control using it).

In the control by the control IC unit 20A, as the state of the vibration (b) by the second motor 2A, the signal of the base vibration (z direction) detected by the base vibration sensor 7 is subsidiarily used as a control input. In other words, in the present control, the state of the vibration (b) by the second motor 2A is monitored by using the signal of the base vibration, and feedback control and the like is performed, thereby performing highly precise control for noise reduction control by vibration drive.

Furthermore, in the control by the control IC unit 20A, the output sound (c) of the fan 10A detected by the microphone 6 is used as a control input, and noise reduction control (ANR) is performed so that the output sound (c) is in a noise-reduced state (noise level is minimum). In other words, in the present control, the result of the drive of the rotation (a) and the vibration (b) of the rotating and vibrating unit R by the first motor 1A and the second motor 2A is monitored by using the signal of the output sound (c), and feedback control and the is performed so that a noise-reduced state is obtained, thereby performing highly precise control for noise reduction control.

Advantages of the configuration of the first embodiment are that a general-purpose product can be used as the ultrasonic motor (first motor 1A), and that a structure for shielding a magnetic field (for example, magnetic-force-line shielding plate) is not required in relation to prevention of interference between the motors (1A, 2A) having magnets.

Moreover, in the present configuration, since detailed control of the number of fan revolutions can be performed by the control of the first motor 1A, synergetic effects of noise reduction control by the combination of the control of the vibration (b) by the second motor 2A and the control of the rotation (a) by the first motor 1A can be readily achieved. However, at the same time, since the mass of the vibrator (comprising the first motor 1A of the rotating and vibrating unit R) is increased, the inertia in the vibration control has to be taken into consideration to perform control.

As a modification example of the first embodiment, other than the combination of the first motor 1A (ultrasonic motor) and the second motor 2A (VCM), for example, a combination of a normal rotor-rotating motor (similarly the second embodiment) and a piezo element can be used.

<Control Circuit>

FIG. 6 shows a configuration example of a control circuit relating to noise reduction control in the control IC unit 20A. The circuit of the control IC unit 20A includes: a basic control circuit 110; a first motor driving circuit 101; a second motor driving circuit 102; a BPF (band pass filter) circuit 103; an FB (feedback) circuit 104; a reversed-phase wave generating circuit 120 (a phase-inverting circuit 105, a phase-angular-advance control circuit 106, a phase amplitude control circuit 107, and an OSC (oscillator) 108); a sound pressure sensor 131; an amplifier 132; a specific frequency processing circuit 133; a vibration signal processing circuit 134; and the like. Further, as control inputs (CTLIN) 51, a signal s1 of the output sound (c) from the above-described microphone 6, a signal s21 of the number of fan revolutions from a fan-speed-sensing circuit 60 (embedded in the first motor 1A), a signal s22 from the base vibration sensor 7 and the like are provided.

The basic control circuit 110 performs a control process for basic rotation drive of the first motor 1A and gives a control signal thereof to the first motor driving circuit 101. In accordance with this, the first motor driving circuit 101 generates and outputs the signal of the first waveform P1 for driving the first motor 1A.

Based on a signal (s8) obtained by processing the control inputs 51 via, for example, the BPF circuit 103, the FB circuit 104, and the reversed-phase-wave generating circuit 120, the second motor driving circuit 102 generates and outputs the signal of the second waveform P2 for driving the second motor 2A.

The reversed-phase-wave generating circuit 120 generates a reversed-phase waveform which serves as a base, by the phase inverting circuit 105. Furthermore, as correction control, the phase-angular-advance control circuit 106 performs phase angle control for cancelling out delay of a signal, and the phase amplitude control circuit 107 performs phase amplitude control. Note that, in the phase angle control, control is performed about the waveform signal of the noise reduction object so that a minor frequency component is reduced. As the phase amplitude control, in order to adjust the force applied in the direction (z direction) of the airflow (c) by a wind pressure (exhaust-air pressure) of the fan 10, the amplitude of a signal (s7) is compensated. In this compensation, since an exhaust-air pressure is applied in the airflow and output sound (c), the acceleration (amplitude) is amplified in the fan air-exhaust direction (z direction) and that in the opposite intake direction is slightly decayed. Note that, in the phase amplitude control, control is performed so that a basic frequency component is reduced about the waveform signal as to the noise reduction object. Note that, a configuration where the phase amplitude control is omitted can be also implemented.

Figures 7A, 7B, 7C, 7D:
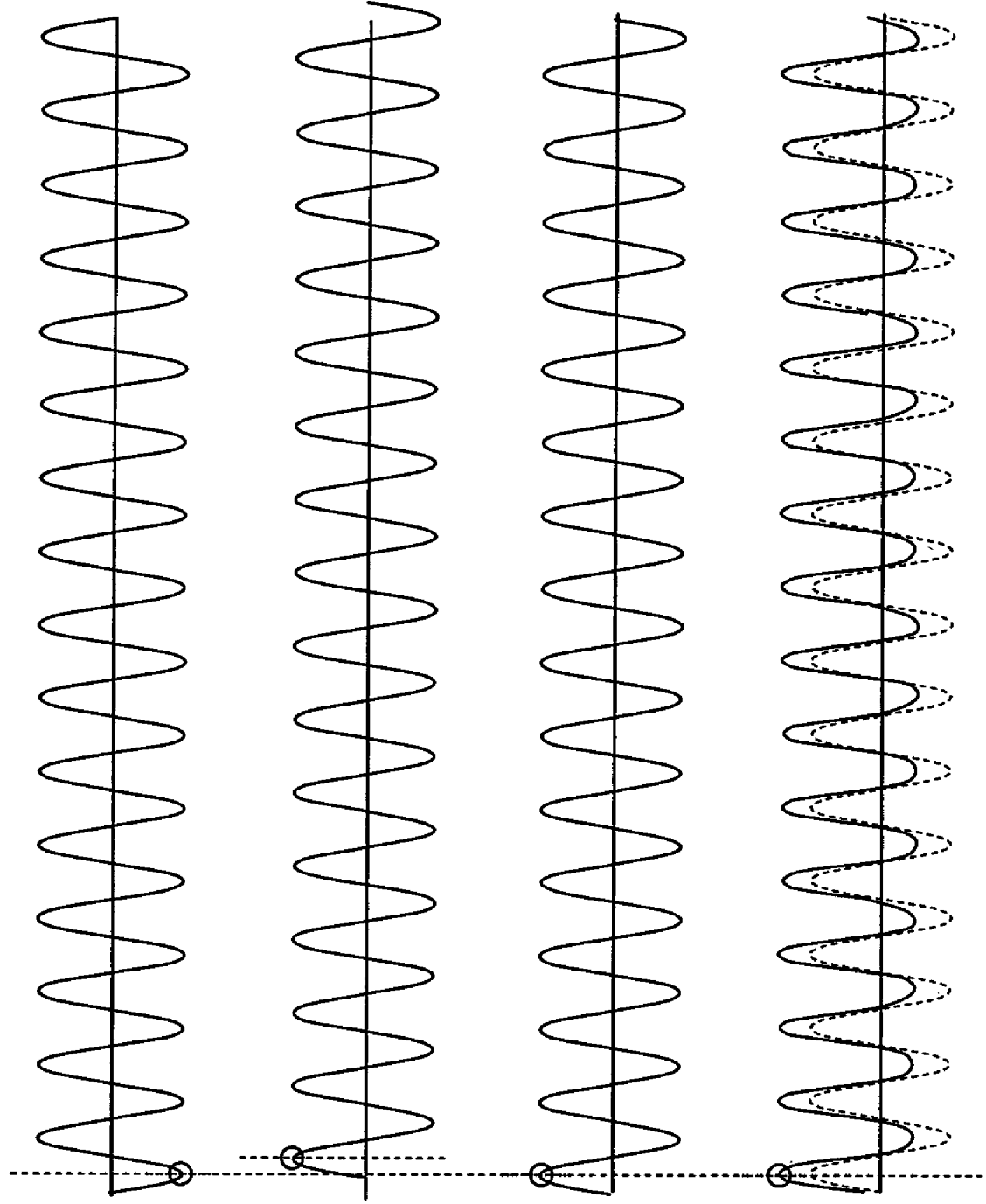
FIG. 7A is a diagram showing an example of a waveform of control by the control IC unit in the electronic device according to the first embodiment of the present invention.
FIG. 7B is a diagram showing an example of a waveform of control by the control IC unit in the electronic device according to the first embodiment of the present invention.
FIG. 7C is a diagram showing an example of a waveform of control by the control IC unit in the electronic device according to the first embodiment of the present invention.
FIG. 7D is a diagram showing an example of a waveform of control by the control IC unit in the electronic device according to the first embodiment of the present invention.

The circuit operation of the control IC unit 20A is as described below. In addition, corresponding to this control, FIGS. 7A to 7D show waveforms of processing object signals. FIG. 7A shows an actual noise (sound waveform of a noise reduction object (particularly, a waveform of a frequency serving as a noise component)), FIG. 7B shows a reversed-phase waveform which is an output (s5) of the phase inverting circuit 105, FIG. 7C shows an output (s6) of the phase-angular-advance control circuit 106, and FIG. 7D shows an output (s8) of the phase amplitude control circuit 107.

As a premise, the rotation (a) is driven by the first motor 1A according to the signal of the first waveform P1 by the basic control circuit 110 and the first motor driving circuit 101. The output sound (c) of the fan 10A generated by this is detected by the microphone 6. Further, the number of fan revolutions (number of revolutions of the blades 5) is detected by the fan-speed-sensing circuit 60 and is reflected to the control of the FB circuit 104.

(1) The signal (s1) of the sound input from the microphone 6 is converted into an electric signal (s2) by the sound pressure sensor 131 (for example, piezoelectric element).

(2) The electric signal (s2) is amplified by the amplifier 132, and the signal (s3) thereof is then caused to pass through the BPF circuit 103, thereby removing components other than the frequency component serving as a noise reduction object (extracting the sound waveform of the frequency component serving as a noise reduction object). In other words, the overall signal (s3) which is the output of the amplifier 132 is inputted to the BPF circuit 103, and it is caused to be an audible signal (s4) as the output of the BPF circuit 103.

As details of the BPF circuit 103, for example, an unreproducible high acoustic range is removed by an LPF (low pass filter) circuit in the drive of the second motor 2A. Alternatively, a low acoustic range which requires an amplitude equal to or higher than the audible field in vibration control is removed by an HPF (high pass filter) (refer to the fourth configuration).

(3) The overall power level in the output signal (s4) of the BPF circuit 103 is inputted to the FB circuit 104 and the phase inverting circuit 105. Herein, the input is considered to be α. The signal (s4, α) is represented, for example, by the waveform of FIG. 7A. (4) The phase of the signal (s4, α) is inverted by the phase inverting circuit 105. The reversed-phase waveform is represented by the waveform of FIG. 7B. The signal (s5) inverted by the phase inverting circuit 105 is inputted to the phase-angular-advance control circuit 106.

(5) In order to cancel out the delay of the signal input from the microphone 6, correction control for advancing the phase of the signal (s5) is performed by the phase-angular-advance control circuit 106. The waveform (s7) obtained by compensating the phase is represented by the waveform of FIG. 7C. In more detail, the phase-angular-advance control circuit 106 generates the signal (s7) having an advanced phase of the input signal (s5) based on the input signal (s6) from the FB circuit 104 and inputs it to the phase-amplitude control circuit 107.

Furthermore, phase-amplitude control is performed as described below. (6) The amplitude of the input signal (s7) is corrected by the phase-amplitude control circuit 107 so that the force in the z direction caused by a fan wind pressure is adjusted. The phase-amplitude control circuit 107 generates the signal (s8) having a compensated amplitude based on the signal (s6) from the FB circuit 104 and outputs it to the second motor driving circuit 102 and the FB circuit 104. The waveform (s8) having the compensated amplitude is represented by the waveform of FIG. 7D.

(7) Meanwhile, the FB circuit 104 performs feedback control by combining the above described control of (5) and (6) so that the power level of the signal (s4, α) is reduced. The FB circuit 104 generates a signal obtained by adding, for example, the input signal (s8) from the phase-amplitude control circuit 107 to the input signal (s4, α) from the BPF circuit 103 through feedback control, i.e., a noise reduction signal in which the reversed phase waveform is overlapped to the original phase waveform.

Then, the second motor driving circuit 102 generates and outputs the signal of the second waveform P2 for driving the second motor 2A (VCM) based on the input signal (s8) from the phase-amplitude control circuit 107. Consequently, the vibration (b) is driven by the second motor 2A, and the output sound (c) of the fan 10A is generated by the combined operation of the rotation (a) and the vibration (b) and detected by the microphone 6. Further, the component of the vibration (b) is detected by the base vibration sensor 7, a detected signal (s22) thereof is processed (processing of extracting the signal of the vibration component serving as a control object) by the vibration signal processing circuit 134, and a signal (s23) thereof is reflected to the control of the FB-circuit 104.

When the circuit operation as described above is performed, particularly, the waveform including a phase inversion component like FIG. 7C or 7D is synthesized as the vibration (b) component with respect to the original waveform as shown in FIG. 7A in the output of the fan 10A, and feedback control is performed so that the phase difference is minimum, the fan output sound (c) is suppressed.

Note that, in the above described control, an input (s21) of the number of fan revolutions subsidiarily used, for example, until the rotation (a) of the rotating and vibrating unit R (blades 5, etc.) of the fan 10A is stabilized in order to, for example, suppress the main noise reduction control (vibration drive control). More specifically, the main control is turned off in the state where the rotation (a) is not constantly stabilized, for example, upon start or stop of the rotation (a) of the fan 10A, and the main control is turned on (active) in the state where the rotation (a) is constantly stabilized. As well as the above description, the input (s22) of the base vibration sensor 7 can be also subsidiarily used for the purpose of, for example, stabilization.

Moreover, as a computing process in the control IC unit 20A, a processing function of specific frequency emphasizing may be provided (similarly applicable also in the second embodiment and the like). More specifically, in the case where this function is effective, in order to use larger sound (noise component) of the fan output sound (c) as a noise reduction object, a process for obtaining a signal of a waveform obtained by selecting and emphasizing merely a specific frequency corresponding to the sound is performed by using, for example, the specific-frequency processing circuit 133 of FIG. 6 (or a circuit obtained by modifying the BPF circuit 103 or the like to a configuration corresponding to this function). The input (s1) from the microphone 6 is inputted to the specific-frequency processing circuit 133 and subjected to this processing, and the processed signal (s31) is inputted to the BPF circuit 103 (or, for example, the FB circuit 104) and used in control.

As described above, according to the first embodiment, compared with conventional techniques, the cooling performance of the fan 10A can be maintained (amount of the airflow (c) is ensured), and the effect of suppressing the output sound (c), i.e., noise reduction (silent) can be obtained as well.

Moreover, as a modification example, as the control input, the control may be configured to be performed merely by the base vibration sensor 7. However, in this case, since the actual output sound (c) cannot be checked (monitored), high-precision control is hard to be performed.

Moreover, as another modification example, as the control input, the control may be configured to be performed merely by the input (s21) of the number of fan revolutions. However, this control is effectively applied when the output level is low (for devices that do not generate much heat).

Second Embodiment

Next, an electronic device 30B (having a fan 10B and a control IC unit 20B) of the second embodiment of the present invention (second configuration) will be described with reference to FIG. 8, etc. The part different from the first embodiment will be mainly described. An overview of the second embodiment is as described below. In the fan 10B, as well as a speaker (conventional technique), a movable mechanism in the axial direction (z direction) is provided. More specifically, the rotating and vibrating unit R (including 3B, 4, 5) can be rotated (a) about a rotation axis 3B as a rotating body and can be vibrated (b) in the z direction as a vibrator. In addition to that, when the vibration (b) according to a reversed phase with respect to noise (outputted by the basic rotation (a)) of the fan 10B is provided, noise reduction control is performed. In other words, the rotating and vibrating unit R is used as a speaker function for noise reduction control by the vibration control in the z direction. By making the rotating and vibrating unit R operate like a speaker, a reversed-phase sound is generated and outputted, thereby obtaining a noise reduction effect.

In FIG. 8, the fan 10B is connected to the control IC unit 20B via the control line 8, thereby constituting the electronic device 30B as a whole. The fan 10B has a first motor 1B and a second motor 2B with respect to the rotation axis 3B in a housing unit 19 of motors and the like of the spindle-ASSY unit 4. In more detail, in the housing unit 19 of motors and the like, in the upper side of a space divided by a magnetic force line shielding plate 18, the first motor 1B, a first bearing 16, and the like are provided with respect to the rotation axis 3B. And, in the lower side space, the second motor 2B, a second bearing 17 and the like are provided with respect to the rotation axis 3B.

The first motor 1B uses a normal rotor-rotating motor that comprises a coil and a magnet. The first motor 1B subjects the rotating and vibrating unit R to drive rotation (a) via the rotation axis 3B. The second motor 2B is for vibration drive in the direction of the rotation axis 3B and comprises a coil and a magnet. The second motor 2B subjects the rotating and vibrating unit R including the rotation axis 3B to drive vibration (b). The magnetic force shielding plate 18 is interposed between the first motor 1B and the second motor 2B. Therefore, the adverse effects to occur mutually between the motors are prevented. Similarly to the first embodiment, the first motor 1B and the second motor 2B are subjected to control drive by the signals of the first waveform P1 and the second waveform P2.

The control IC unit 20B uses, for example, the input of the microphone 6 and the input of the base vibration sensor 7 as control inputs to measure individual frequency components of the input signals and perform computing processes. These computing processes are the processes of, for example, the above-described (for example, FIG. 6) reversed-phase waveform generation, feedback control, and specific frequency emphasis.

In the manner described above, according to the second embodiment, the cooling performance of the fan 10B is maintained, and the noise reduction effect is achieved as well as the first embodiment.

As a modification example of the configuration of the second embodiment, for example, the following one can be implemented. In the case where the noise level of the fan 10B is low (when measurement and monitoring can be performed based on the input of the microphone 6), a constant noise reduction effect may be achieved in some cases by causing a current in which the frequency component of the reversed phase with respect to the fan output sound (c) generated by the rotation (a) is added, to flow through the first motor 1B without using the second motor 2B (and control thereof). For example, in the control IC unit 20B, the input (s21) of the fan revolution number detection circuit 60 is used to generate and add the reversed phase waveform with respect to the output waveform generated by the number of fan revolutions, and the first motor 1B is driven by that signal.

Third Embodiment

Next, an electronic device 30C (it comprises a fan 10C and a control IC unit 20C) of the third embodiment of the present invention (third configuration) will be described with reference to FIG. 9 and so forth. The part different from the first embodiment will be mainly described. The overview of the third embodiment is as described below. In the electronic device 30C, the fan 10C has a configuration in which a speaker 40 for noise reduction control is embedded instead of the VCM (second motor 2). To give an outline, the second motor 2 and the corresponding circuits are replaced by the speaker 40 and corresponding circuits in the configuration.

In the fan 10C, for vibration control in the direction (z direction) of a rotation axis 3C, the speaker 40 is provided at a center position of the rotating body (including 3C, 4, 5) in the exhaust opening surface e side. In addition to that, the vibration (b) corresponding to the reversed-phase sound with respect to the noise (output by the basic rotation (a)) of the fan 10C is provided by controlling drive of the speaker 40. As a result, noise reduction control is performed for the output sound (c) of the fan 10C.

In FIG. 9, the fan 10C is connected to the control IC unit 20C via the control line 8, thereby constituting the electronic device 30C as a whole. The fan 10C has a first motor (rotor-rotating motor) 1C with respect to the rotation axis 3C in the spindle-ASSY unit 4. In more detail, in a space in the spindle-ASSY unit 4, the first motor 1C, a bearing 31, a magnet 32, etc. are provided in the lower side of the space divided by a magnetic force line shielding plate 33 (speaker housing unit). In the upper side of the space divided by the magnetic force line shielding plate 33 (speaker housing unit), the speaker 40 is provided so as to be exposed on the exhaust opening surface e. The vibrator is the speaker 40. The rotating body includes the rotation axis 3C, the spindle-ASSY unit 4, the blades 5, etc. The vibration (b) in the z direction is performed by the speaker 40. Therefore, the vibration is not required by the rotating body.

The control IC unit 20C includes the first motor driving circuit 101, a speaker driving circuit 140, etc., and is connected to the corresponding first motor 1C and the speaker 40 respectively by the control lines 8. In correspondence to the signal of the first waveform P1 from the first motor drive circuit 101, the first motor 1C drives rotation (a) of the rotating body via the rotation axis 3C. In correspondence to the signal of the second waveform P2 from the speaker drive circuit 140, the speaker 40 drives the vibration (b), in other words, outputs reversed-phase sound for noise reduction.

The speaker 40 is for vibration control in the z direction and comprises a coil and a magnet. The magnetic force line shielding plate 33 is interposed between the first motor 1C and the speaker 40, thereby preventing the mutual influence.

In the present configuration, the control IC unit 20C uses control inputs such as the input of the microphone 6, the input of the base vibration sensor 7, etc. similarly to the above described cases to measure the individual frequency components of the inputs and perform computing processes. Then, based on the computing processes, the vibration (b) of the speaker 40 is driven by the signal from the speaker drive circuit 140. As a result, reversed-phase sound is generated from the speaker 40 with respect to the fan output sound generated by driving the rotation (a) by the first motor 1C. In this manner, these two types of sound are synthesized in the comprehensive output sound (c) of the fan 10C, thereby reducing the noise.

Note that, as a conventional technique example, a configuration that reduces noise by disposing an individual fan (blower) and a speaker in combination and outputting inverted sound from the speaker with respect to the output sound of the fan is present. On the other hand, the present configuration is different from the conventional technique example and is the configuration in which the fan 10 itself embeds the speaker 40 so as to perform noise reduction control.

The VCM and speaker will be supplementally described. Generally, a speaker is a type of an electrodynamic vibration device which generates vibration by using a permanent magnet and a coil. When the coil is placed in the magnetic field of the permanent magnet and a current is caused to flow through the coil, according to the Fleming's left-hand rule, a force is generated perpendicularly to the magnetic field and the current. When cone paper connected to the coil is vibrated by this force, sound is reproduced. The coil of the speaker is called a voice coil. The VCM is used for various purposes other than reproduction of sound. Similarly to the speaker, a voice coil placed in the magnetic field of the permanent magnet linearly moves in proportion to the flowing current. In order to cause the current to flow through the coil, lead wires are required. The second motor 2A of the first embodiment uses the above described VCM in the noise reduction control like the speaker. The speaker 40 of the third embodiment directly performs noise reduction control by the speaker.

As a modification example of the third embodiment, a configuration comprising a combination of the configuration of the first embodiment and the configuration of the third embodiment, i.e., a configuration in which the speaker 40 for noise reduction control is subsidiarily provided at a center position of the rotating and vibrating unit R of the fan 10 may be employed.

Other Embodiments

Next, other configuration examples (for example, modification examples) relating to the above-described embodiments will be described.

<Fourth Configuration>

The electronic device 30 of the fourth configuration will be described with reference to FIG. 10 to FIGS. 11A to 11C and so forth. The fourth configuration is a configuration that performs master-slave control by combining a plurality of fans 10, and the configuration has an interface therefor. The electronic device 10 of the fourth configuration has one or more fans 10 and the corresponding control IC unit 20. As a whole system, the plurality of fans 10 are used and mutually connected like the arrangement example of FIG. 10. One or more fans 10 are used as master fans 10M, and the other one or more fans 10 are used as slave fans 10S. As the master-slave control, the operation (control) of the peripheral slave fans 10S is caused to follow (synchronize) the operation (control) of the master fans 10M.

Figure 10:
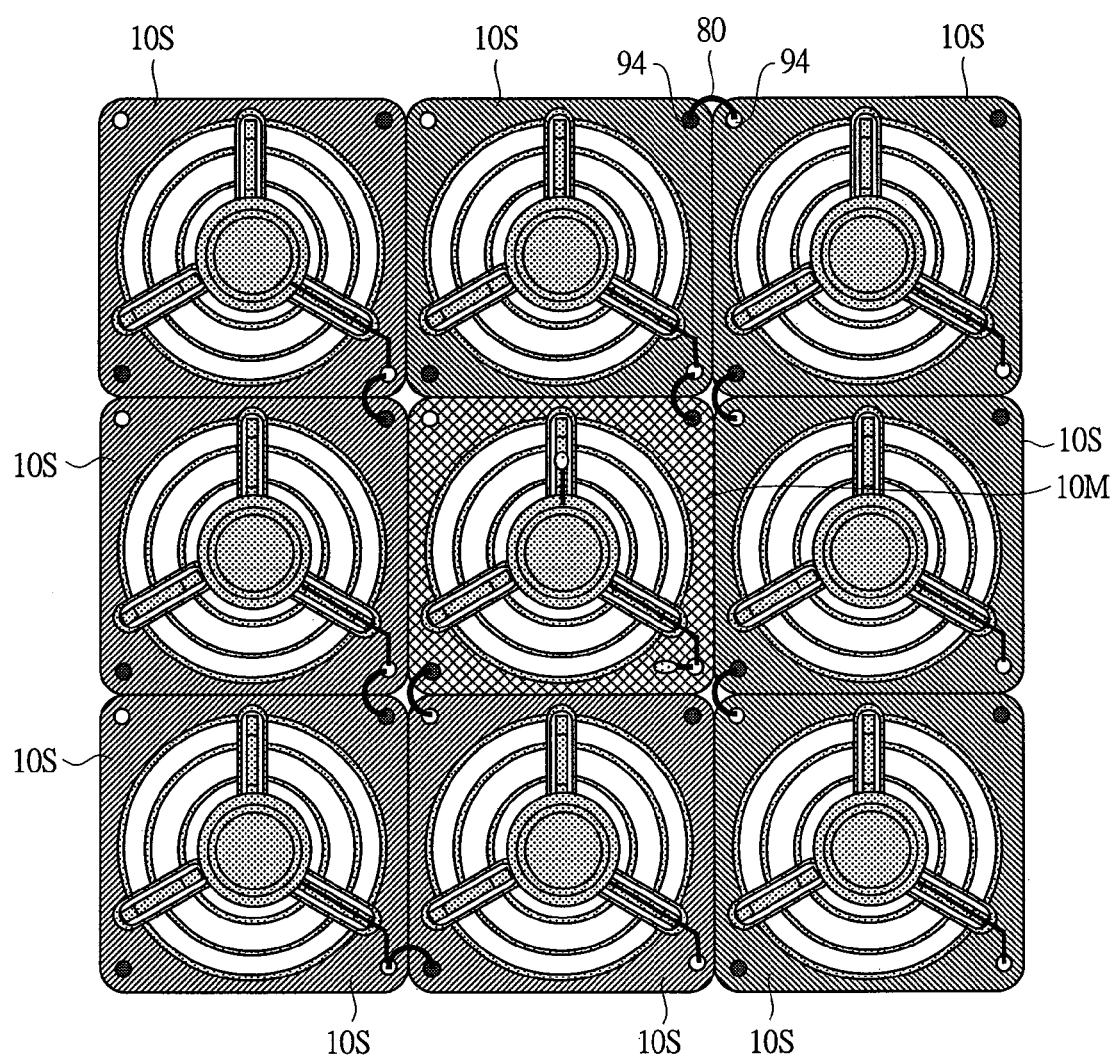
FIG. 10 is a diagram showing a configuration example of arrangement and connection in the plane viewed from an exhaust-opening side of fans in a system comprised of mutual connections of a plurality of fans in an electronic device according to an embodiment (fourth configuration) of the present invention.

In the example of FIG. 10, with respect to one master fan 10M at a center position, the plurality of slave fans 10S are connected in the periphery thereof so that they are connected together like beads. And, for example, a system comprising nine fans 10 in total is constituted. Note that, for example, a configuration in which the slave fans 10S are respectively connected to the master fans 10M by the ratio of 1:1 may be employed.

The master fan 10M (electronic device 30) comprises, similarly to the first embodiment and the like, the first motor 1, the second motor 2 (or the speaker 40 for noise reduction control), the microphone 6, the base vibration sensor 7, etc., and the corresponding control IC unit 20 comprises corresponding drive circuits, processing circuits of control inputs, etc. The slave fan 10S (electronic device 30) is not required to have control input means and corresponding processing circuits and so forth such as the microphone 6 and the base vibration sensor 7 but has a simplified configuration compared with the master fan 10M.

In the mutual connection of the fans 10, in detail, at corners of the chassis 9 of the master fan 10M and the slave fans 10S, I/F parts 94 (94A, 94B) (connection terminals) corresponding to the function of mutual connection between the fans 10 (external connection of other fans 10) are provided (the I/F part 93 in FIG. 5 is particularly for connection with the control IC unit 20). Between the two connected fans 10 (master fan 10M and slave fan 10S or between slave fans 10), the I/F parts 94 are mutually connected by a connection line 80. Particularly, as shown in FIG. 11C, in the mutually connected I/F parts 94, one side of them (94A) serves as an input terminal (IN), and the other side (94B) serves as an output terminal (OUT). And, although it is not shown, the connection terminals 94 are mutually wired in the fans 10.

Figure 11A:
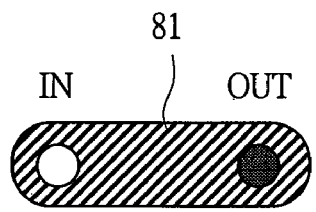
FIG. 11A is a diagram showing a configuration in which connection parts mutually connecting I/F parts of the fans are provided in the electronic device according to the embodiment (fourth configuration) of the present invention and showing the configuration of an upper surface of the connection part.
Figure 11B:
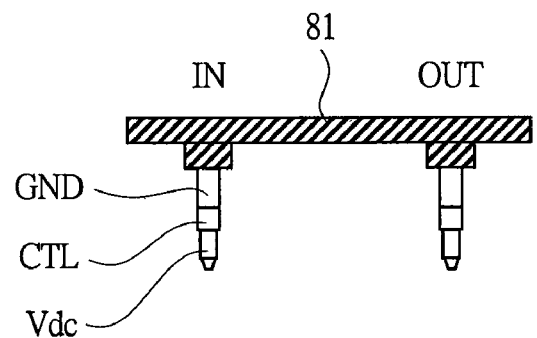
FIG. 11B is a diagram showing the configuration in which connection parts mutually connecting I/F parts of the fans are provided in the electronic device according to the embodiment (fourth configuration) of the present invention and showing the configuration viewed from a side of the connection part.
Figure 11C:
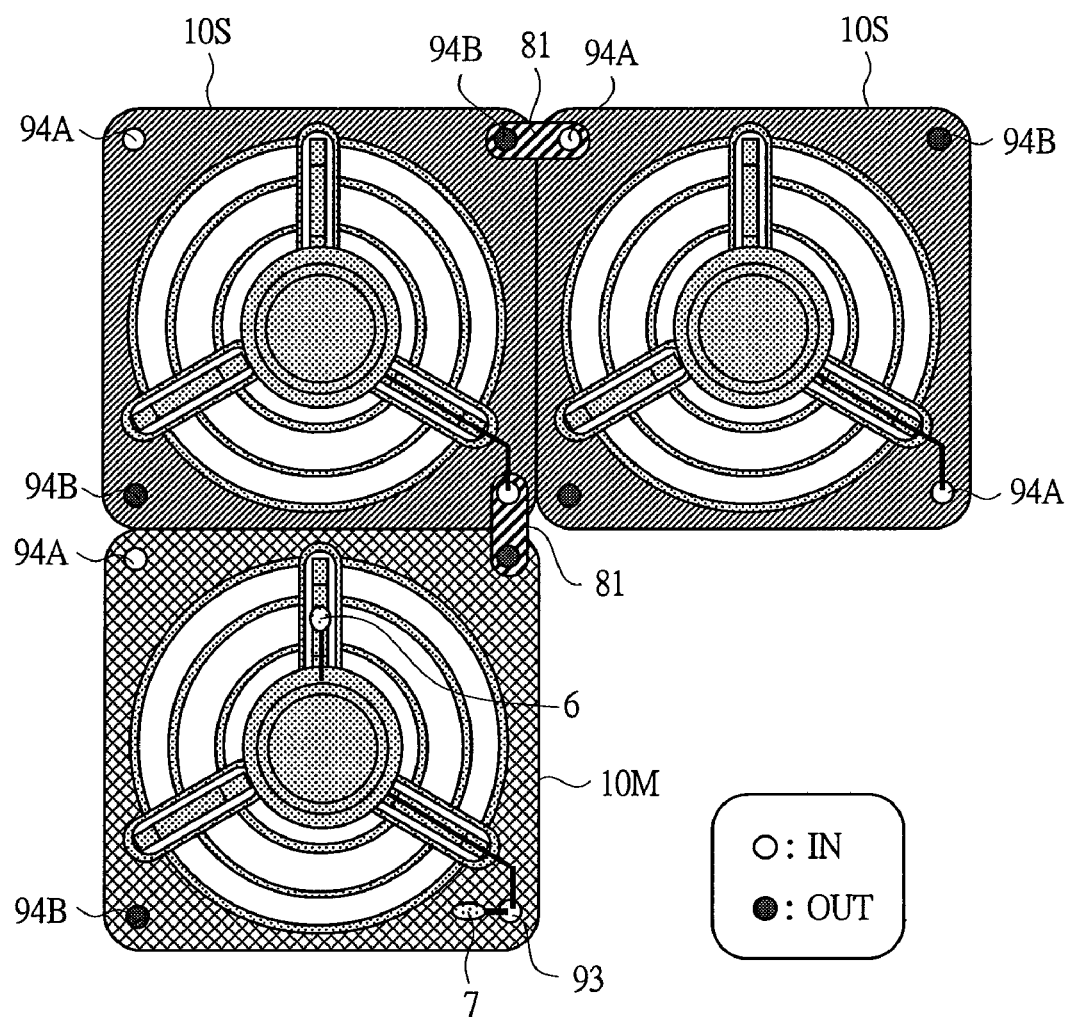
FIG. 11C is a diagram showing the configuration in which connection parts mutually connecting I/F parts of the fans are provided in the electronic device according to the embodiment (fourth configuration) of the present invention and showing a planar configuration example for mutually connecting the fans by using the connection parts.

As shown in FIGS. 11A to 11C, connection parts 81 which are dedicated parts may be provided as the connection lines 80 for mutually connecting the I/F parts 94. In FIGS. 11A and 11B, the connection part 81 has a projected terminal including layers of, for example, ground (GND), control (CTL), and direct voltage (Vdc) at each of both ends of the main body thereof, i.e., the IN side corresponding to the input terminal (94A) and the OUT side corresponding to the output terminal (94B), and the structure thereof can be connected when it is inserted in a recessed terminal of the corresponding I/F part 94. The main body of the connection part 81 having a predetermined length includes a connection line inside. And particularly, the respective I/F parts 93 and 94 may have both the function of connection with the control IC unit 20 and the function of mutual connection between the fans 10.

In the master/slave control, between the fans 10 (10M, 10S), control input signals and control output signals, etc. are transmitted via the I/F parts 93 and 94. For example, the control IC unit 20 which performs control of the entirety uses control inputs such as the input of the microphone 6 and subjects the main fan 10M to highly precise noise reduction control via the I/F part 93. Then, a signal for synchronizing the noise reduction control is transmitted from the output terminal (94B) of the master fan 10M to the input terminal (94A) of the slave fan 10S via the connection part 81. Furthermore, similar signals are transmitted to the plurality of slave fans 10S, which are connected together like beads, via the connection between the I/F parts 94. In this manner, the slave fans 10S drive the first motor 1 and the second motor 2 (or the speaker 40) similarly to the operation of the master fan 10M. Consequently, the output sound (c) of the master fan 10M is reduced and, in addition to that, the output sound (c) of the peripheral slave fans 10S is also reduced.

Furthermore, for example, as the master-slave control, in correspondence to an input signal from the master fan 10M, an operation of the rotation (a) synchronized with the rotation position of the fan of the master fan 10M may be performed by a synchronization operation of the slave fan 10S. In other words, an improved noise reduction effect can be expected by the operation of mutually matching the rotation positions (in other words, rotation phase or rotation speed (number of revolutions)) of the blades 5 of the respective plurality of fans 10.

As described above, according to the fourth configuration, when a cooling system is configured by using the plurality of fans 10, in addition to the noise reduction effect in the unit of the fan 10 of the first embodiment and the like, it can be realized at low cost.

Further, as a modification example of the fourth configuration, the example described below can be implemented for example. A configuration in which different motors (1, 2) are driven respectively by the master fan 10M and the slave fan 10S and a predetermined noise reduction function and effects can be obtained by the comprehensive of the drives. For example, control of the vibration (b) is performed by driving the second motor 2 only by the master fan 10M. The plurality of slave fans 10S are divided into groups (for example, four fans on the right side and four fans on the left side of FIG. 10), each of the groups is caused to have a different function and role, and a predetermined noise reduction function and effect are obtained by the comprehensive thereof. For example, the slave fan 10S of one of the groups has a configuration that has the VCM (second motor 2A), the BPF circuit 103, the FB circuit 104 and so forth as shown in the first embodiment and performs control of the vibration (b), and the slave fan 10S of the other group has a configuration that performs only control of the rotation (a) without having the VCM (second motor 2A) and so forth.

<Fifth Constitution>

Next, the electronic device 30 of the fifth configuration will be described with reference to FIG. 12. The fifth configuration is a configuration that performs noise reduction control by applying different process and drive corresponding to frequency components of the objective sound. For example, among the objective sound (input of the microphone 6 of the output sound (c)), low-frequency components serve as a noise reduction object by the control of the vibration (b) of the VCM (second motor 2A) of the first embodiment, and high-frequency components serve as a noise reduction object by the control of the rotation (a) of the fan-rotating motor (FM) (first motor 1A). According to the fifth configuration, more detailed noise reduction control can be performed.

Figure 12:
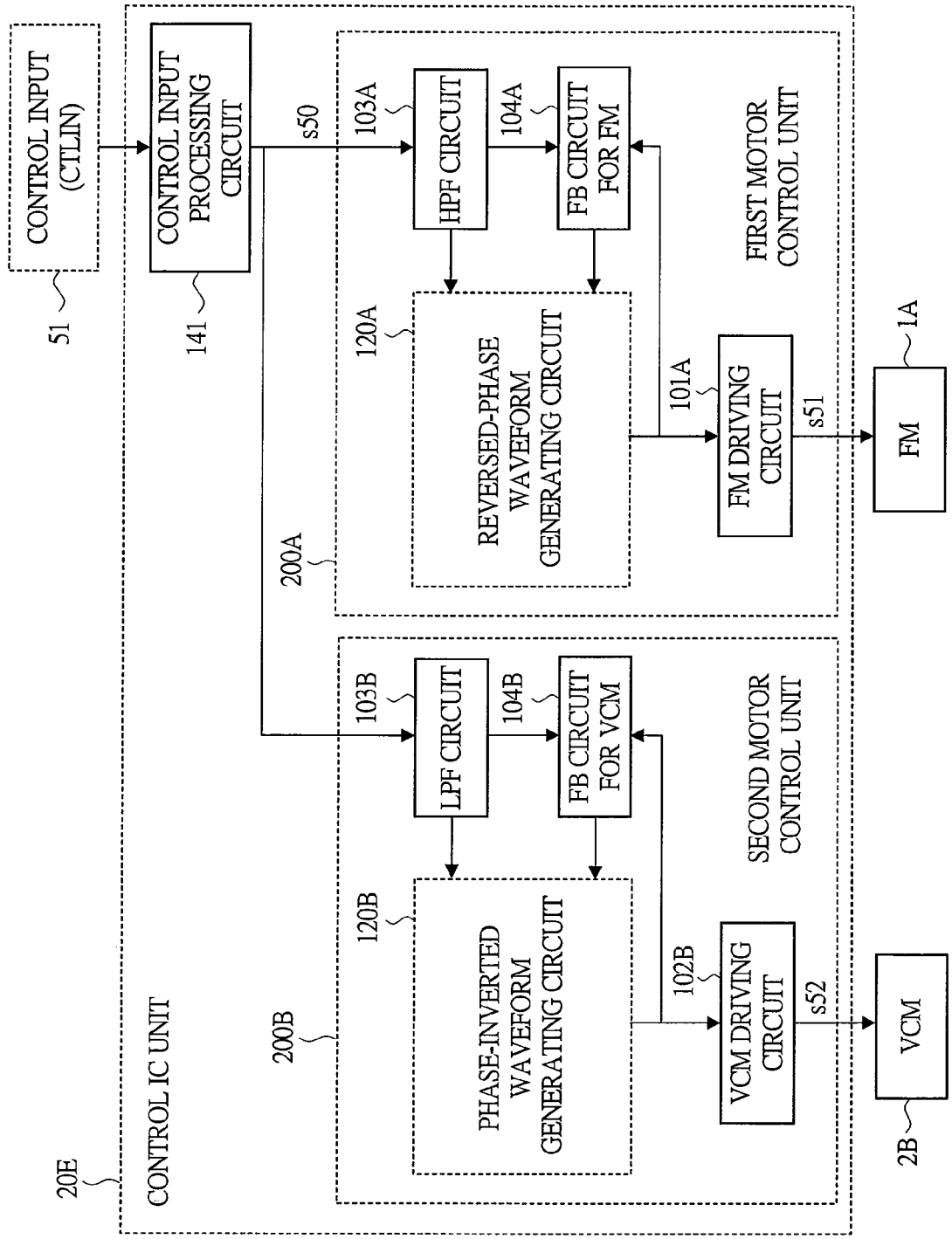
FIG. 12 is a diagram showing a circuit configuration example of a control IC unit in an electronic device 30 according to an embodiment (fifth configuration) of the present invention.

FIG. 12 shows a configuration of a control IC unit 20E corresponding to this case. In the control IC unit 20E, in accordance with the frequency of a signal (s50) which is obtained by processing the above-described control input 51 such as the input of the microphone 6 by a control input processing circuit 141, and different processing circuits (first motor control unit 200A, second motor control unit 200B) are applied. In accordance with output signals (s51, s52) thereof, the corresponding first motor 1A (FM) and the second motor 2A (VCM) are individually driven.

The first motor control unit 200A comprises an HPF (high-pass filter) circuit 103A, an FB circuit 104A for FM, a reversed-phase wave generating circuit 120A, an FM driving circuit 101A and so forth. The second motor control unit 200B comprises an LPF (low-pass filter) circuit 103B, an FB circuit 104B for VCM, a reversed-phase wave generating circuit 120B, a VCM drive circuit 102B and so forth. The basic functions of these circuits are same as the BPF circuit 103, the FB circuit 104, the reversed-phase wave generating circuit 120 and the like in FIG. 6.

In the above-described configuration, in the computing process of the signal (s50) of the objective sound, different filters are applied, for example, a process via the HPF circuit 103A is applied for the FM (first motor 1A), and a process via the LPF circuit 103B is applied for the VCM (second motor 2A). In each of the processing circuits (200A, 200B), a reversed-phase waveform is similarly synthesized by feedback control.

Note that, the configuration that sorts the processing circuits and drive objects depending on the frequency component of the objective sound like the fifth configuration can be applied to the system of the fourth configuration comprised of the plurality of fans 10 as described above.

<Sixth Configuration>

Next, the electronic device 30 of the sixth configuration will be described with reference to FIGS. 13A and 13B. The sixth configuration is a configuration that reproduces and uses a fan output sound waveform, which is recorded in advance, for noise reduction control.

Figure 13A:
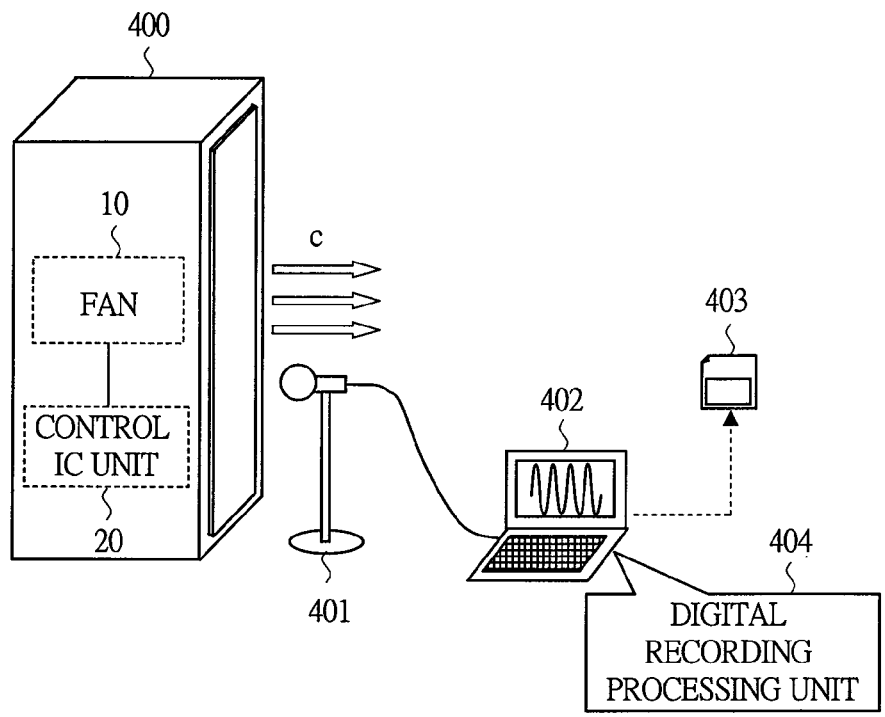
FIG. 13A is a diagram showing a configuration upon recording in the electronic device 30 according to an embodiment (sixth configuration) of the present invention.

In FIG. 13A, as an example of the electronic device 30 having the fan 10 (or a unit comprising a plurality of fans), a comparatively-large disk array apparatus 400 is provided. For example, airflow and output sound (c) of the embedded fan 10 are generated from a back-surface side of the disk array apparatus 400. In the recording in advance, the airflow and output sound (c) of the fan 10, which are the noise reduction objects, are inputted by a set microphone 401 and subjected to digital recording by a processing of a digital recording processing unit 404 in, for example, an information processing apparatus 402 (for example, PC). Waveform data of the digital recording (for example, in the format of MP3 or WAVE file) is stored in an external memory 403 (for example, a micro-SD card memory). Particularly, the waveform data of the basic frequency (positive phase or reversed phase) serving as the noise components of the output sound (c) of the noise reduction object fan 10 is recorded and stored.

Figure 13B:
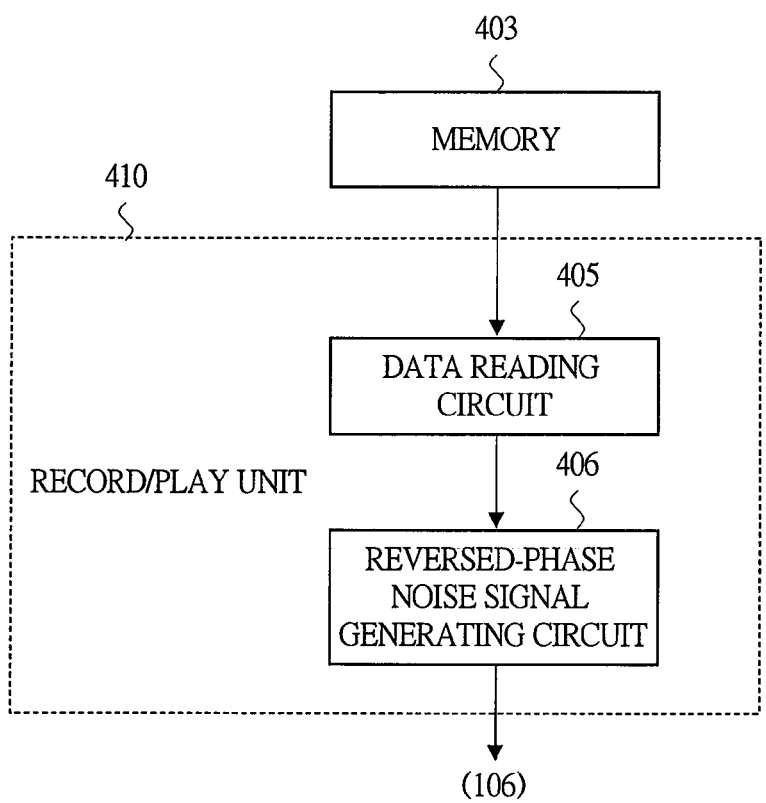
FIG. 13B is a diagram showing a circuit configuration example of a part of a control IC unit in the electronic device 30 according to an embodiment (sixth configuration) of the present invention.

In FIG. 13B, upon actual operation of the disk array apparatus 400 including the fan 10, in a record/play unit 410 provided in, for example, the control IC unit 20, the waveform data stored in the external memory 403 is read by a data reading circuit 405. Based on the read data signal, a signal corresponding to the above-described reversed-phase waveform (inverted noise signal) is generated by a processing by an inverted-noise-signal generating circuit 406 and outputted (for example, inputted to the above-described phase-angular-advance control circuit 106). While the signal (including inverted noise signal components) is outputted from the record/play unit 410 in this manner, in the control IC unit 20, as well as the above description, phase control is performed so that, for example, the input of the microphone 6 (noise level) becomes minimum.

In the present configuration, the corresponding waveform which is stored in advance is used to perform noise reduction control unlike the above-described reversed-phase wave generating circuit 120 (phase inverting circuit 105) which generates a reversed-phase waveform in real time to perform noise reduction control. Therefore, the computing process of the above-described reversed-phase wave generating circuit 120 is not required or is eliminated. However, since the memory 403 or the like to store the waveform data is required, application to the electronic device 30, for example, the disk array apparatus 400 that has allowance capable of including the memory 403 is effective.

In the foregoing, the invention made by the inventors of the present invention has been concretely described based on the embodiments. However, it is needless to say that the present invention is not limited to the foregoing embodiments and various modifications and alterations can be made within the scope of the present invention.

What is claimed is:

1. An electronic device having
   a blower and a control circuit unit thereof,
   wherein the blower has a rotating body including a blade and a shaft for generating airflow and a vibrator including the rotating body, and the rotating body and the vibrator serve as a rotating and vibrating unit in combination; and the blower has a first motor arranged to rotate the rotating body about the shaft, and a second motor arranged to vibrate the vibrator in the axial direction of the shaft; the control circuit unit has a first circuit arranged to output a signal of a first waveform for the rotation to the first motor so as to control rotation drive of the first motor, and a second circuit arranged to output a signal of a second waveform for the vibration to the second motor so as to control vibration drive of the second motor; and
   the rotation and vibration of the rotating and vibrating unit caused by controlling drive of the first and second motors creates an airflow and sound generated by a synthesized output of a first output corresponding to the rotation and a second output corresponding to the vibration;
   a microphone arranged to detect the generated-sound of the blower, wherein the control circuit unit is arranged to use the detected generated-sound as a control input to the control circuit unit so as to subject the second waveform to feedback control;
   wherein the control circuit unit is arranged to generate, in response to the generated-sound detected by the microphone, the second waveform as a reversed-phase waveform having a phase that is reverse to that of the first waveform or a waveform detected as an output result of the rotation drive caused by the first waveform, and to control the first and second waveforms;
   a circuit arranged to detect the number of revolutions of the rotating body; and
   a vibration sensor arranged to detect the state of the vibration in the direction of the shaft;
   wherein the control circuit unit is arranged to control the phase angle and the phase amplitude of the second waveform in response to at least one of the detected number of revolutions and the detected vibration state as a control input, so as to subject the reversed-phase second waveform to further feedback control, thereby suppressing the generated-sound generated by the synthesized output.

2. The electronic device having the blower according to claim 1,
   wherein the vibrator includes the first motor;
   the vibration of the vibrator including the first motor is controlled by driving the second motor by the second circuit;
   the first motor is a sonic motor; and
   the second motor is a voice coil motor provided outside the first motor.

* * * * *